United States Patent [19]

Gordon et al.

[11] Patent Number: 5,008,804

[45] Date of Patent: Apr. 16, 1991

[54] ROBOTIC TELEVISION-CAMERA DOLLY SYSTEM

[75] Inventors: Gary B. Gordon, Saratoga, Calif.; Robert R. Gonnelli, Valley Cottage, N.Y.

[73] Assignee: Total Spectrum Manufacturing Inc., Valley Cottage, N.Y.

[21] Appl. No.: 574,852

[22] Filed: Aug. 30, 1990

Related U.S. Application Data

[63] Continuation of Ser. No. 228,933, Jun. 23, 1988, Pat. No. 4,959,798.

[51] Int. Cl.$^5$ ............................................. F16M 3/00
[52] U.S. Cl. ............................... 364/167.01; 358/229; 248/647; 352/197; 352/243
[58] Field of Search .................... 364/167.01; 358/229; 352/197, 242, 243, 244; 248/647

[56] References Cited

U.S. PATENT DOCUMENTS 4,657,220  4/1987  Lindsay ............................... 352/243

Primary Examiner—Allen R. MacDonald
Attorney, Agent, or Firm—Spencer & Frank

[57] ABSTRACT

A robotic camera dolly system includes a motorized dolly which rolls freely across a studio floor under computer control, the dolly carrying a camera. Targets are provided on the floor at various locations from which camera shots are to be taken. The dolly is moved from one target to the vicinity of another target according to a learned sequence of movements controlled by a remote dolly computer. The learned sequence of movements is taught with the aid of a joystick, and the motions are replayed based on dead reckoning. In order to correct translational and angular errors in the position of the dolly at the destination target, optosensors are provided on the dolly for use in detecting and reorienting the dolly relative to the destination target. The open loop control of dolly movement can be taught with a control stick and the motions replayed based on dead reckoning.

17 Claims, 10 Drawing Sheets

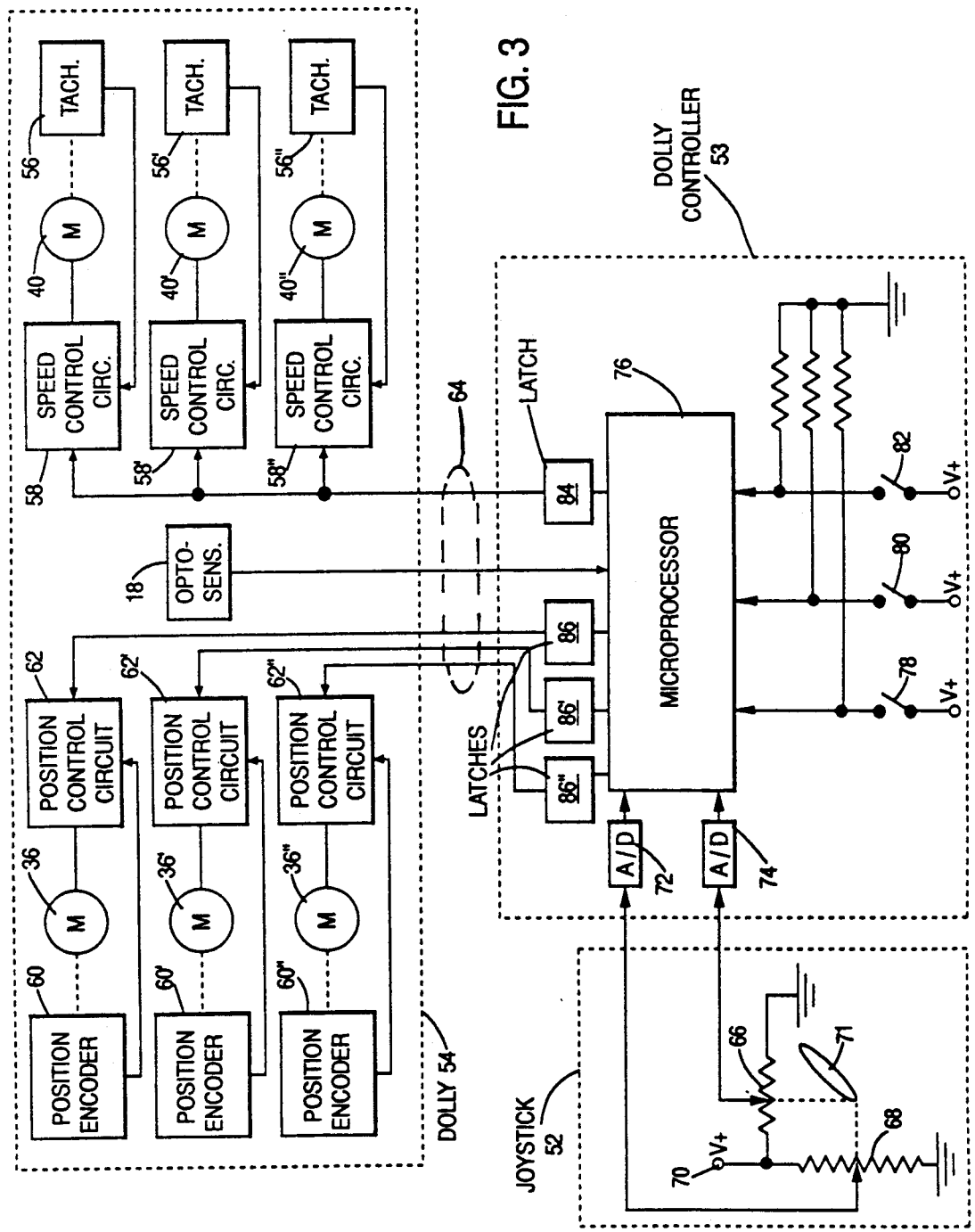

ROBOTIC TELEVISION-CAMERA DOLLY SYSTEM

This is a continuation of application Ser. No. 07/228,933 filed June 23rd, 1988 U.S. Pat. No. 4,959,798.

BACKGROUND OF THE INVENTION

The invention relates to a robotic camera dolly system, and more specifically to such a system which can remotely and automatically direct a camera dolly among studio floor positions.

As the television broadcast market continues to mature, there is growing interest in controlling costs and improving equipment utilization through the greater use of automation. Newsrooms are leading the way. Central computers are being used to organize the overall news gathering process and the sequencing of the show, and increasingly to control certain studio equipment such as teleprompters.

The trend is toward controlling ever more studio equipment, such as lighting, character-generators, and effects generators.

Cameras, however, are still manually controlled despite the fact most of their shots are well structured, highly repetitive, and known in advance. Automating them therefore has the potential to further reduce costs and improve equipment utilization in an automated studio. Automating shot taking would require that the shots be framed before the television show, assigned names, and then recalled as needed.

A camera shot can be thought of as consisting of seven parameters, all set by the cameraman. They are camera focus, zoom, tilt, pan, pedestal height, and the x and y positions of the camera dolly on the floor. Ideally all seven degrees of freedom are servo controlled, and stored as a set. The control and storage of the first four parameters: focus, zoom, tilt, and pan, is known within the prior art. Examples are the products manufactured by Total Spectrum Manufacturing Inc., known as the Multicontroller and the HS-110-P robotic camera head. Partial camera automation is practical at this level, but the cameras must either be anchored, or dollied about manually. These restrictions tend to nullify the gains of automation, obtainable with respect to focus, zoom, tilt, and pan, since the restrictions require manual intervention, or additional cameras, or aesthetic compromises.

One way to achieve mobility is to place the cameras on a track; however this method has its drawbacks. It clutters the floor, is expensive to relocate, is one-dimensional, limits camera locations to those along the track, and prevents the cameras from crossing past each other.

Another way to achieve mobility is to place the cameras on wheeled dollies and, with the aid of a motor control system, to direct the dollies to the appropriate camera locations and angular orientations. However, this approach runs into the problem of assuring precision in movements which may be of the order of 50 feet in a typical television studio, it being obviously very important in television production that both the location and orientation of the cameras be properly located while shooting. Moreover, when a series of predetermined locations is to be traversed by the camera the problem would become successively magnified as such error would accumulate from shooting location to shooting location.

SUMMARY OF THE INVENTION

An object of the invention is, therefore, to provide a dolly apparatus which ca be taught to automatically transport a video camera between preselected locations and angular orientations with great precision on a studio floor.

In accordance with one aspect of the invention this object is met with a dolly apparatus which can be taught to automatically transport the camera under open loop control (dead reckoning) to the immediate vicinity of targets positioned at and/or in relation to preselected locations on the studio floor, and with the aid of sensors on the dolly, to thereafter correct the translational position and the angular orientation of the dolly and/or the camera with respect to the targets.

In accordance with another aspect of the invention, the dolly carries a camera carriage which can raise and lower and rotate the camera in a conventional manner, and rides on powered and steerable wheels which are controlled first in an open loop manner and then in a closed loop manner with target sensors in order to bring the dolly close to, and then precisely on, a target.

In accordance with another aspect of the invention, the targets are marked in the plane of movement of the dolly, such as on a studio floor, and designate at least two translational positions from which camera shots are to be taken. The targets may also mark the angular orientation which the dolly should adopt at the respective translational positions. Sensor means such as a plurality of downwardly directed optical sensors are provided on the dolly for detecting the translational position and angular orientation of the dolly relative to the target when the dolly has reached the close vicinity of the target by dead reckoning.

A computer-based dolly controller is connected to the dolly via a serial data link. The controller contains a control stick, coupled to the wheels via the serial data link and used to control steering and propulsion of the wheels, and is employed to teach the motions to be performed during the dead reckoning movement. The computer contains means to continually sample and store for future use, the instantaneous position demand signals which instruct the speed and steering of the wheels. This teaching approach is analogous to the manner in which the aforementioned Multicontroller and HS-110-P robotic head can be used to teach and store coordinated pan, tilt, zoom and focus motions of the robotic head and the camera which it supports. In the case of teaching speed and steering of the dolly wheels, the taught motion may be somewhat complicated to move from one camera location to a second one, for example from a weather set to a news set, the path and speed being chosen by the computer operator so as to avoid other cameras and other obstacles, and being stored in the computer.

In accordance with one other embodiment of the invention, the movement of the dolly from one target to the next is taught in steps, that is, along a succession of selected points along the floor.

During such movements, the wheels normally all point in the same direction: in television terms, the wheels move in a "crab mode". When the dolly has reached the immediate vicinity of the target in completing the first stage of repositioning the camera to a new camera shooting position, the wheels move in the crab mode to correct the translational position and may be steered to be tangent to a circle to allow the dolly to rotate for correcting the angular orientation.

With a target of about two feet square photoreproduced on the floor and having sufficient detail to allow automatic centering of the dolly above it, as well as to correct its angular orientation, it is necessary only that the dead reckoning control be capable of guiding the dolly to within a foot or so of its desired location, from which the alignment control will be able to sense the target in order to perform the automatic centering and correction of angular orientation. The intrinsic accuracy of the dolly and the dead reckoning control is such that the dolly is capable of traversing typical studio distances of 50 feet ending up within a foot of the destination target with only a small error in angular orientation, so as to be within homing range of the destination target.

The targets do not have to be aligned in either position or rotation to any absolute grid or coordinate system. Since the system is taught a path and speed between particular end points, and traces this track by dead reckoning, the only reference required is the actual position and orientation of the target from which the dolly starts its move (and which therefore defines the starting position and orientation of the dolly). In effect, the person teaching the motion shows the dolly system the coordinates of the destination target, using the reference from the origin target. Subsequent moves begin anew, and each move has context only with respect to the target from which it originates. It is this recalibrating (the closed loop homing in on the target) at the end of each move that allows repeated moving, from shooting location to shooting location in a sequence, to work. The system breaks up a large problem into small managable ones, allowing the present camera automation system to work without accumulating excessive errors.

BRIEF DESCRIPTION OF THE DRAWINGS

These and other aspects of the invention will be more completely understood from the following description of the preferred embodiment when taken with the accompanying drawings in which:

FIG. 3 is a block diagram of a television-camera dolly system in accordance with a first embodiment of the present invention;

DESCRIPTION OF THE PREFERRED EMBODIMENTS

Figure 1A:
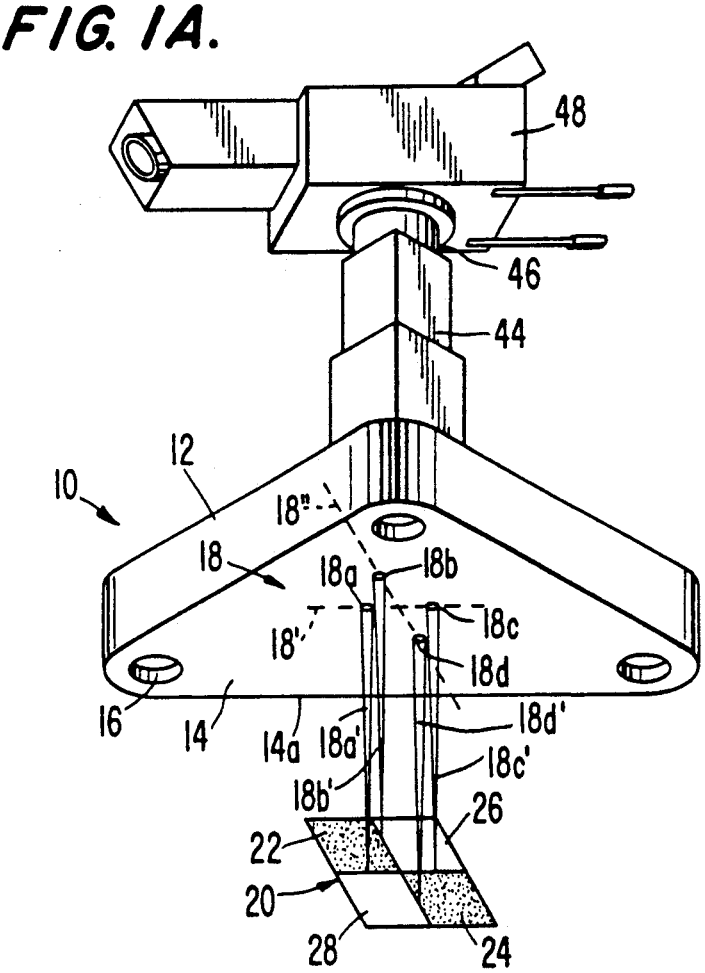
FIG. 1A is a perspective view of a robotic dolly with photosensors for reading a "target," with the wheel assemblies being omitted for simplicity of illustration.

Referring now to FIG. 1A, there is shown a camera assembly 10 (with the wheel assemblies being omitted for ease of illustration). The camera assembly 10 includes a dolly 12 of generally equilateral triangle shape. At each of the three corners of the generally equilateral triangle shaped bottom surface 14 of the dolly 12 are provided circular openings 16 for shafts to mount the respective wheel assemblies (not shown in FIG. 1A). In a central portion of the bottom surface 14 are provided optosensors 18 arranged in a square pattern, with the diagonally opposite optosensors 18a and 18c being arranged on a line 18' parallel to the side edge 14a of the bottom surface 14. The other diagonally opposite optosensors 18b and 18d are arranged on a line 18" which is perpendicular to line 18'.

The optosensors 18 are conventional devices which project respective beams directly downward so as to focus onto the studio floor, and which include respective sensors to detect light reflected back from the floor. As will be described in greater detail below, the optosensors are used to precisely locate and orient the dolly with respect to one of various targets 20 located on the studio floor. Targets 20 which is shown from below and, for the purpose of illustration only, assumed to be partially transparent in FIG. 1A may, for example, be two feet square and consist of adhesive-backed sheets of acetate, with a pattern of two black squares 22 and 24 and two white squares 26 and 28, the boundaries between the squares defining X and Y axes. As will be described in greater detail below, the optosensors 18 are utilized to detect the transitions between the black and white squares. The optosensors 18 may, for example, be those manufactured by TRW having part number TRW-0PB703A, and are preferably spaced 1 foot apart when the target 20 is 2 feet square.

Figure 1B:
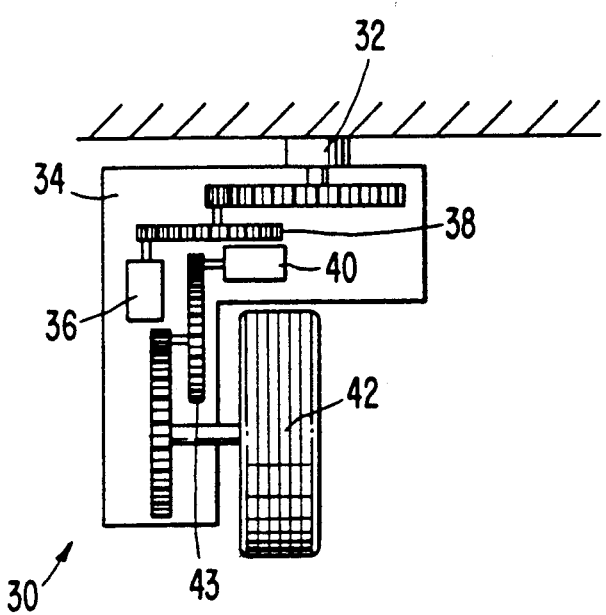
FIG. 1B is a schematic illustration of the electromechanical elements of one of three identical wheel assemblies for use with the dolly.

One of three identical wheel assemblies 30 is illustrated in FIG. 1B and includes a mounting shaft 32 for mounting the wheel assembly in a respective opening 16 in the bottom surface of the dolly 12. Wheel assembly 30 may be of conventional design and may be a model number HS-105P produced by Total Spectrum Manufacturing Company. Wheel assembly 30 includes a casing 34 housing therein a steering motor 36 which rotates the assembly 30 about the mounting shaft 32 via anti-backlash reduction gears 38. A propulsion motor 40 rotates the wheel 42 through an anti-backlash reduction gears 43. Control of the respective motors for the wheel assemblies will be described below.

Figure 1C:
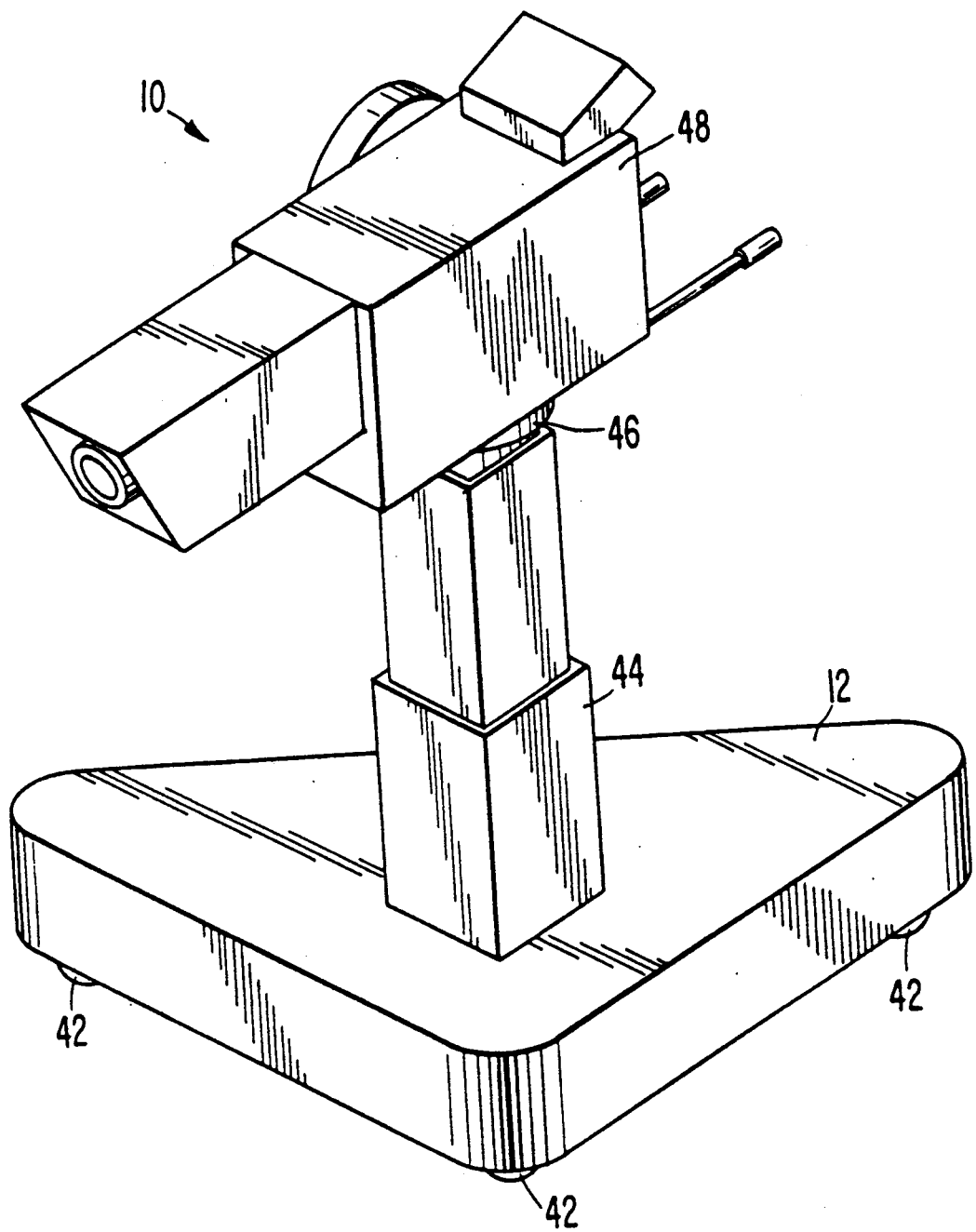
FIG. 1C is a perspective view of the dolly with a camera, head, and support.

FIG. 1C illustrates the entire camera assembly 10. Shown are the wheels 42 supporting the dolly 12 on which a vertically adjustable pedestal 44 supports the horizontally rotatable camera head 46. The camera head may, for example, be a conventional head such as the Total Spectrum Manufacturing model number HS-110P. The camera 48 is therefore rotatably and vertically adjustably mounted on the dolly 12 by the pedestal 44 and head 46.

Figure 2:
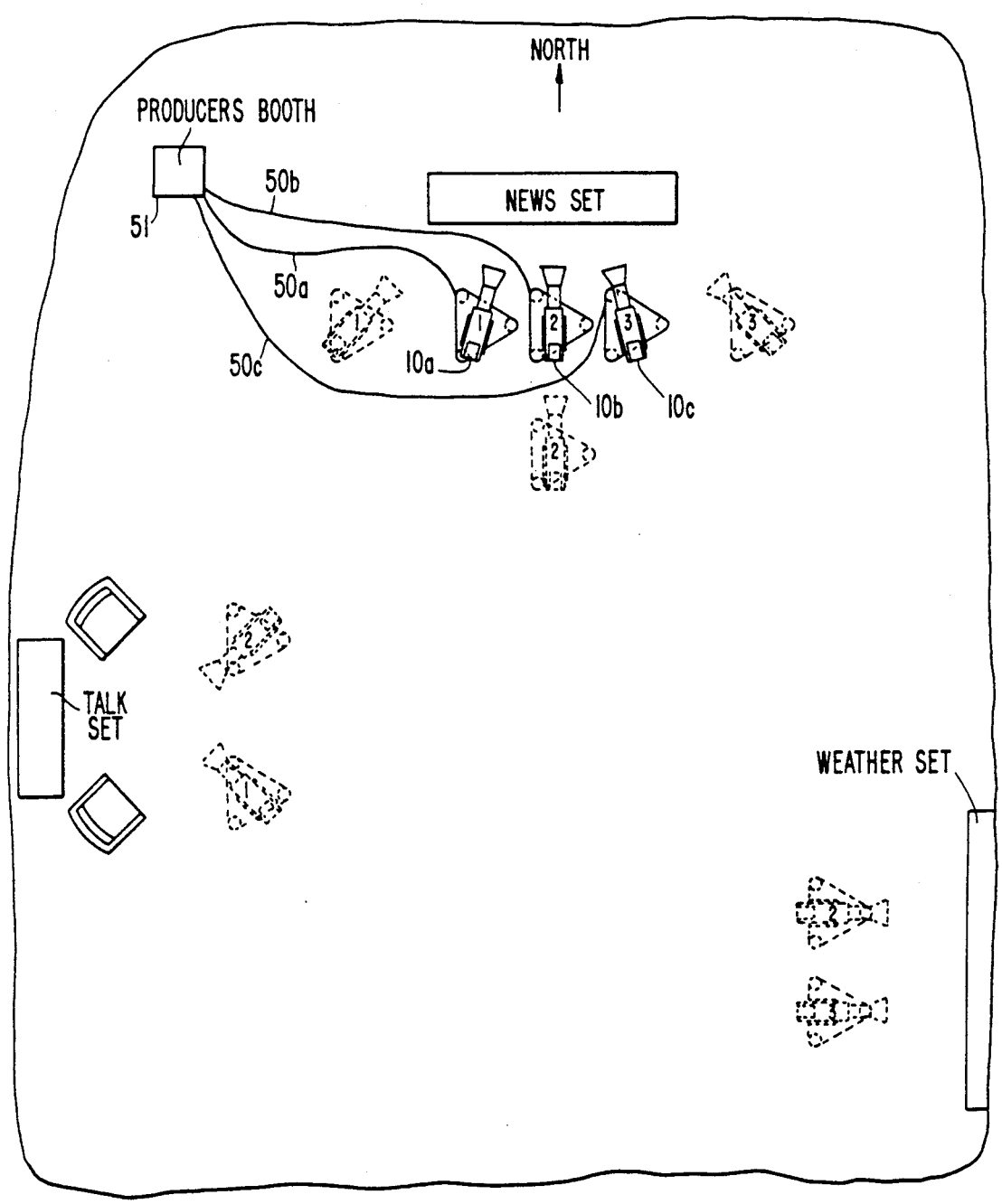
FIG. 2 is a schematic illustration of a typical studio floor, showing various positions to be taken by the camera assemblies.

In use, for example, on a television studio floor having a news set, a weather set and a talk-show set, two or more camera assemblies 10 may be employed and the pan, tilt, zoom, focus and vertical height of the respective cameras controlled via cables from a remotely located dolly controller. Typical positions of the dolly and angular positions of the cameras thereon are illustrated in FIG. 2 showing a typical arrangement of a talk-show set, a news set and a weather set with the camera assemblies 10a, 10b and 10c indicated in front of the news set, alternate positions thereof in front of the sets being shown in broken line. As can be seen in FIG. 2, in order to move the camera assemblies 10 from one location to the other without contacting the other camera assemblies or otherwise interfering with their operation or running over their respective cables 50, which extend from a producer's booth 51, the camera assemblies 10 may be required to take a somewhat complex or circuitous route. The cameras need to be movable so as to allow at least two-camera coverage of each of the two sets, as shown. On occasion, a pull-back shot requires one of the cameras to recede from the set, during an on-air move. The various positions which the dollies are to take ar marked with targets as described above.

A camera assembly 10 moves from one target to another in two steps. The first step moves the camera assembly 10 by dead reckoning from one target to a position very close to the other target (destination target) along a taught path. Once the camera assembly has reached the vicinity of the destination target, final alignment of the dolly is accomplished in a closed loop manner with the aide of the optosensors thereon sensing the target.

A simplified first embodiment of a robotic television-camera dolly system in accordance with the present invention will now be described with reference to FIG. 3, which schematically illustrates a joystick 52, a dolly controller 53, and a dolly 54 having the same construction as the dolly 12 previously discussed with respect to FIGS. 1A-1C. In particular, dolly 54 includes optosensors 18 and three wheels 42 (See FIG. 1C), one of which is rotated by the propulsion motor 40 and directed (with respect to dolly 54) by the steering motor 36. One of the remaining wheels is rotated by propulstion motor 40' and directed by steering motor 36', and the last wheel is rotated by propulstion motor 40", and directed by steering motor 36". Motors 40—40" are mechanically connected to tachometers 56—56", which provide feedback signals for speed control circuits 58—58". Speed control circuits 58—58" receive speed command signals from dolly controller 53, as will be discussed. Position encoders 60—60", mounted on motors 36—36", are indirectly linked thereto (although not illustrated in FIG. 1B) so as to detect the relative positions of the casings 34 with respect to the base of the dolly. Position encoders 60—60" provide feedback signals for position control circuits 62—62", which additionally receive position or steering command signals from dolly controller 53. Dolly 54 is connected to dolly controller 53 by a cable 64, which may also include conductors (not illustrated) for various other purposes such as providing power to the motors and returning the video signal.

Joystick 52 includes an X-potentiometer 66 and a Y-potentiometer 68. Each potentiometer is connected between a power supply terminal 70 at a voltage V and ground. Potentiometers 66 and 68 have sliding taps which are mechanically connected to a joystick handle 71, this mechanical connection being schematically indicated by the dotted lines in FIG. 3. The mechanical connection is such that the sliding tap of potentiometer 66 is moved in accordance with the X component of the movement of handle 71, and the sliding tap of potentiometer 68 is moved in accordance with the Y component of the movement of handle 71. Although not illustrated, handle 71 is preferably spring-biased, so that it returns to a vertical position when it is released. In the vertical position, the voltage at the tap of potentiometer 66 is V/2 and the voltage at the tap of potentiometer 68 is also V/2.

Dolly controller 53 includes an analog/digital converter 72 which is connected to the sliding tap of potentiometer 68 to receive the Y component of the signal from joystick 52, and another analog/digital converter 74 which is connected to the sliding tap of potentiometer 66 to receive the X component. The resulting X and Y digital signals provide inputs for microprocessor 76. Other inputs to microprocessor 76 are provided by path-training switch 78, path-repeat switch 80, and final alignment switch 82. Microprocessor 76 also receives signals from optosensors 18. Based upon these input signals microprocessor 76 generates a speed command signal which is stored in speed control latch 84 to control the speed of motors 40—40", and direction command signals which are stored in direction control latches 86—86" to control the directions in which motors 36—36" aim their respective wheels. Although not illustrated in FIG. 3, dolly controller 53 may also include digital/analog converters connected to latches 84 and 86—86" to convert the command signals to analog form before they are transmitted via cable 64 to dolly 54.

Figure 4A:
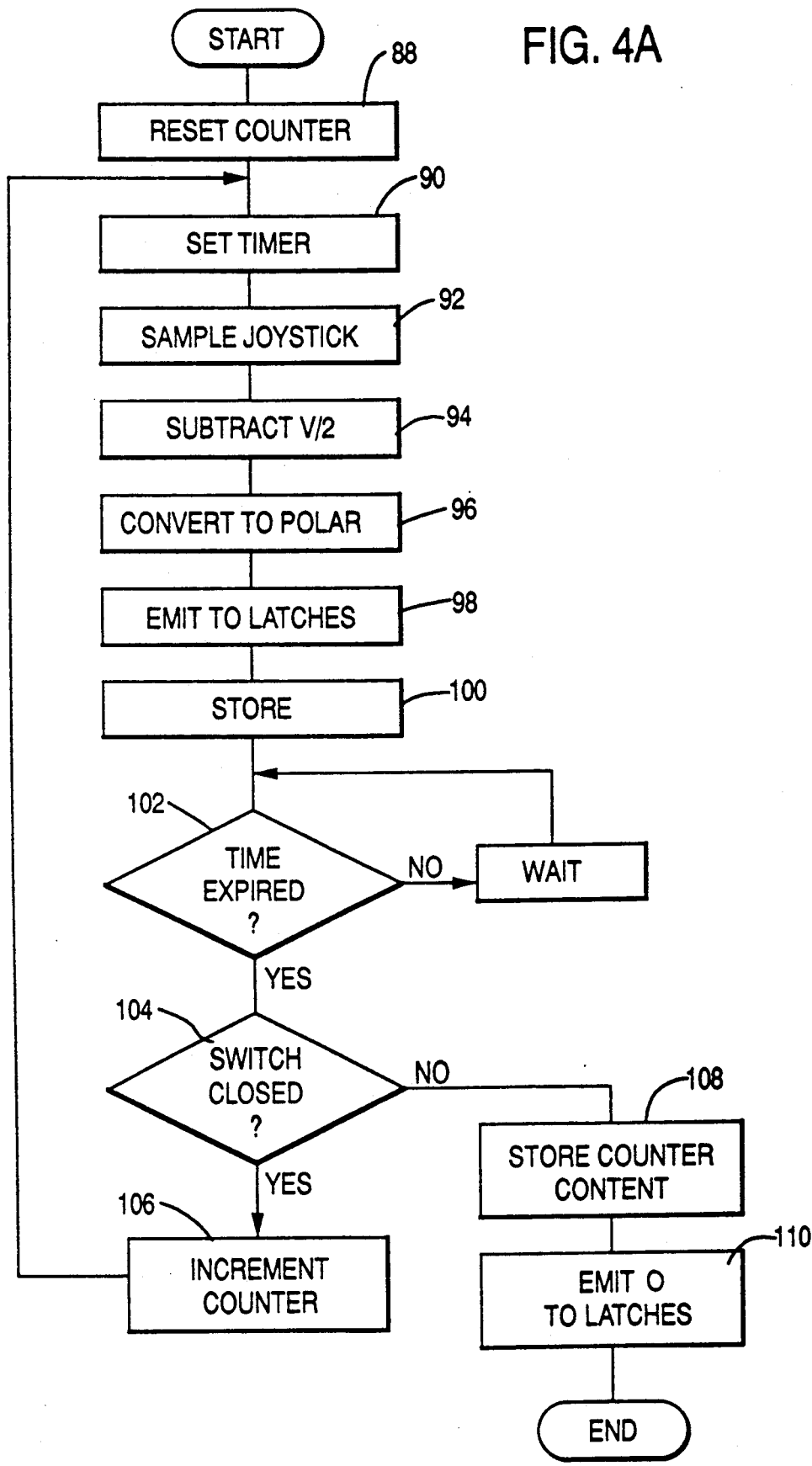
FIG. 4A and 4B are flow charts of programs for the teaching and repeat programs employed in the first embodiment.

The path-training program will now be described with reference to FIGS. 3 and 4A. It is assumed that dolly 54 is positioned over an initial target 20 (see FIG. 1A) and is to be moved from this initial position to a final position above a different target 20. An operator closes path-training switch 78 and then manipulates the handle 71 of joystick 52 to guide dolly 54 along the desired path. After switch 78 has been closed, a counter in microprocessor 76 is reset at step 88. Thereafter, a timer 90 in microprocessor 76 is set. Timer 90 times-out after 1/15th second. At step 92, the X signal from A/D converter 74 and the Y signal from A/D converter 72 are read. These signals need to be corrected, since the X and Y signals both correspond to V/2 when handle 71 is in its vertical position. This correction is accomplished at step 94, where V/2 is subtracted from each signal. The result is essentially a transformation of coordinates, so that the movement of handle 71 can be interpreted thereafter in a true cartesian fashion; that is, in the plus and minus X directions and the plus and minus Y directions. The cartesian coordinates are then converted to polar form at step 96. As a result, the cartesian coordinates of the position of handle 71 are transformed into a radial signal and an angular signal. The radial signal corresponds to the desired speed of dolly 54 and in step 98 is stored in latch 84 as the speed command signal. The angular signal corresponds to the desired direction of dolly 54 and in step 98 is stored in each of latches 86—86" as the direction command signal. The speed command signal is conveyed via cable 64 to speed control circuits 58—58" to drive motors 40—40" at the desired speed and the direction command signal is conveyed via cable 64 to position control circuits 62—62" to point the wheels in the desired direction. It should be noted that the wheels are kept parallel during the path-teaching procedure. The same pair of command signals which are used to drive dolly 54 under the control of joystick 52 is also stored at step 100 in a memory in microprocessor 76. The address of the storage location is determined by the current content of the counter in microprocessor 76.

After the command signals are stored at step 100, a check is made at step 102 to determine whether 1/15th of a second has expired. If not, microprocessor 76 waits until it has. After expiration of the time, another check is made at step 104 to determine whether path-teaching switch 78 is still closed. Since the training operator opens this switch when dolly 54 arrives at the desired location, "yes" at step 104 indicates that the path has not been completed. The counter is thereupon incremented at step 106, and the program returns to step 90 so that command signals for the next 1/15th of a second can be stored. On the other hand, if switch 78 is not closed, the counter content is stored at step 108, and at step 110 latches 84 and 86—86" are reset to zero to insure that dolly 54 does not move unintentionally.

Figure 4B:
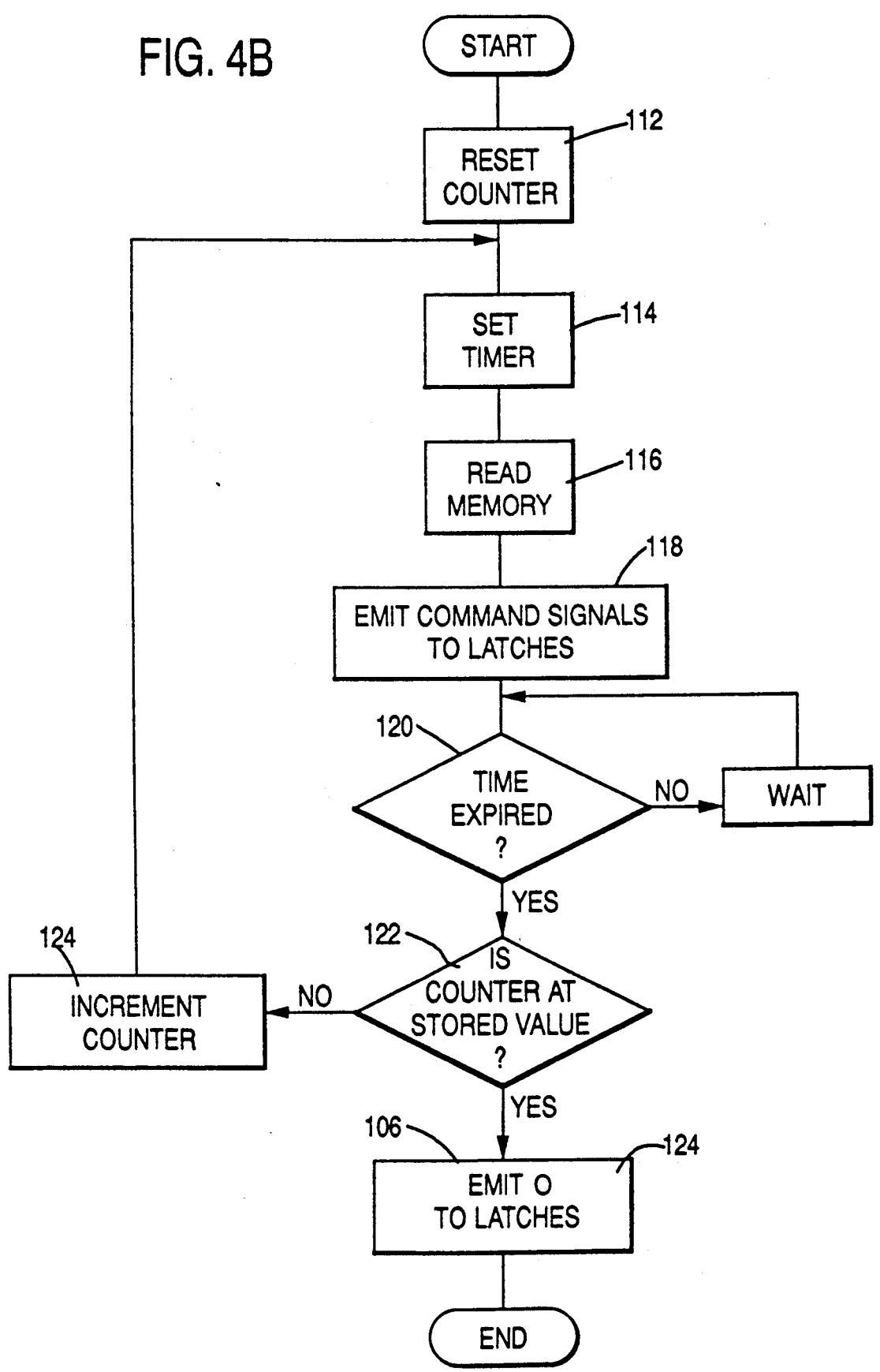

The path-repeat program will now be described with reference to FIGS. 3 and 4B. It is assumed that dolly 54 is currently located at an initial position and has already been trained to move from this initial position to the desired final position. After path-repeat switch 80 has been closed, the counter in microprocessor 76 is reset at step 112 and the 1/15th second timer in microprocessor 76 is set at step at 114. The stored speed command and direction command signals are then read at step 116, with the counter content providing the address of the desired pair of command signals. The read-out command signals are transferred to latches 84 and 86—86" at step 118, and dolly 54 is driven accordingly. At step 120 a check is made to determined whether 1/15th of a second has expired, and after it has a check is made at step 122 to determine whether the counter content now equals the value stored at step 108 in FIG. 4A. If these values are equal, it will be apparent that all of the command signals stored during the training operation have been read out and have been applied, in pairs, for intervals of 1/15th of a second to dolly 54. By "dead reckoning," dolly 54 should now be very close to the desired final position, so at step 124 zeros are emitted to latches 84 and 86—86" to replace any previous values that may have been stored. On the other hand if "no" is the result of the query at step 122, the counter in microprocessor 76 is incremented at step 124 and the program returns to step 114. The next pair of command signals (that is, speed command and direction command) will be read out of memory from the locations determined by the counter content, and thereafter will be applied for a 1/15th of a second to dolly 54.

Turning next to FIGS. 3, 5A—5F, and 6, the final alignment of dolly 54 after path-repeat switch 80 has been opened and alignment switch 82 has been closed will now be described. It will be assumed that dolly 54 is close to the desired position upon conclusion of the path-repeat procedure (for example, within 6 inches) and that it is oriented approximately in the desired direction (which normally would be within a few degrees but could in principle be any angle less than 45 degrees). With the squares 22-28 of target 20 each being one foot on a side and with the optosensors spaced one foot apart, then with the dolly within 6 inches of the desired position over the target, the colors of the squares detected by the respective optosensors completely define which squares the optosensors are detecting. The target 20 at the desired position is FIG. 5A, along with four optosensors A, B, C, and D which are disposed above target 20 in a square pattern as illustrated. Optosensors A, B, C, and D correspond to optosensors 18a, 18b, 18c, and 18d of FIG. 1A. In FIGS. 5A—5F the sides of the square defined by the four optosensors A-D are shown in solid lines, and the diagonals are shown in dotted lines. As will be apparent from FIG. 5A, a coordinate system is defined by the transition between white square 28 and black square 22; the transition between black square 22 and white square 26; the transition between white square 26 and black square 24; and the transition between black square 24 and white square 28.

Figure 5A:
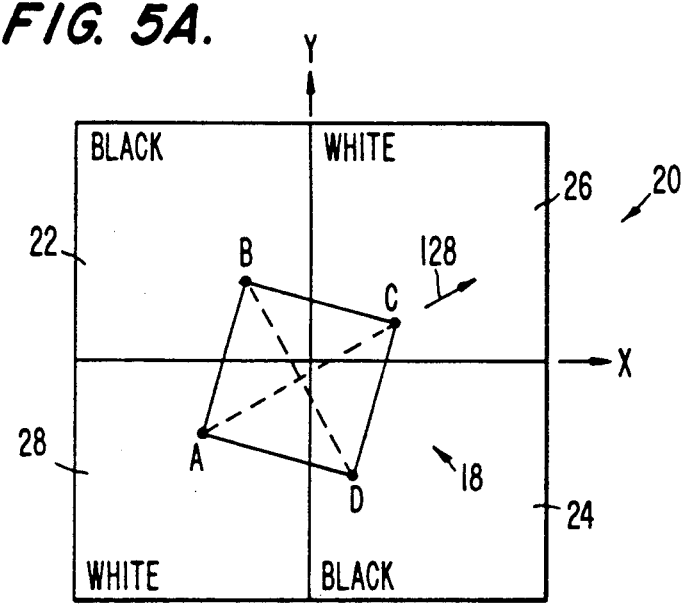
FIGS. 5A-5F are schematic representations illustrating the optosensors with respect to the target during alignment in the first embodiment.
Figure 5B:
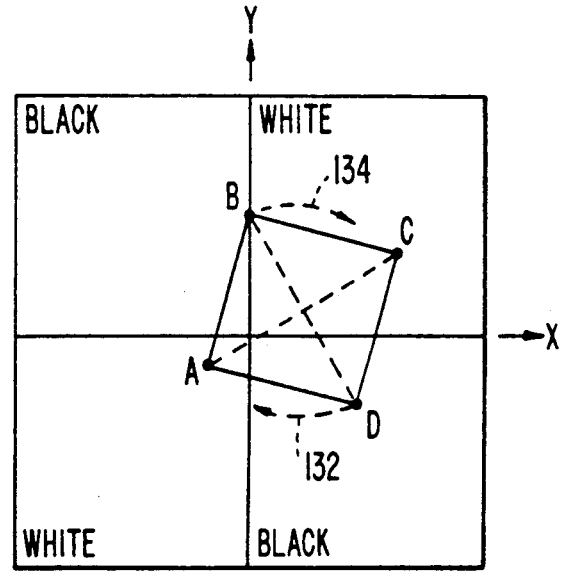
Figure 6:
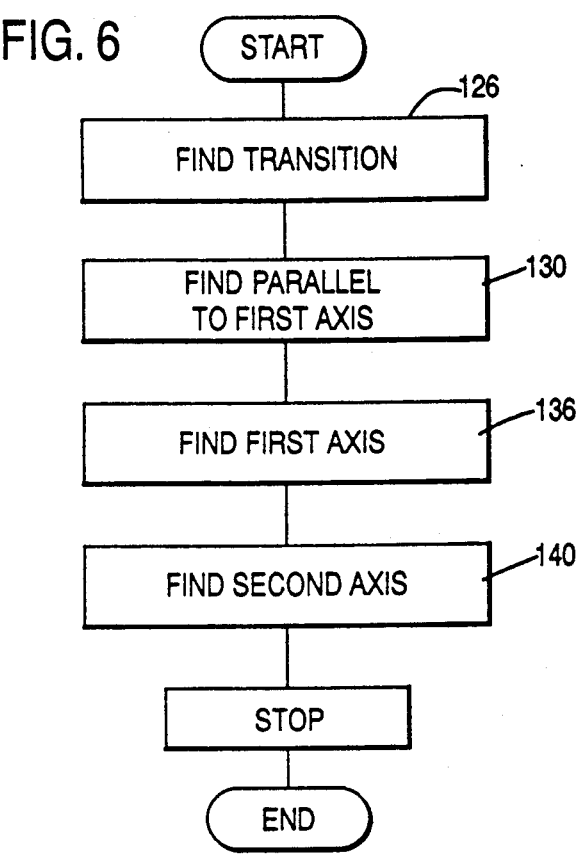
FIG. 6 is a flow chart illustrating the alignment program for the first embodiment.

After alignment switch 82 has been closed, the first problem is to locate a transition between a white square and a black square (step 126 in FIG. 6). This is accomplished by moving dolly 54 linearly until one of the optosensors A-D detects such a transition. Although the direction of this linear movement can be arbitrary, in FIG. 5A the direction is selected to be along the diagonal AC as indicated by arrow 128. To accomplish this movement all of the wheels are turned parallel to diagonal AC (that is command values which identify diagonal AC are loaded into latches 86—86" of FIG. 3), and the dolly 54 is moved at a slow speed (that is, a small speed command signal is loaded into latch 84 of FIG. 3). The value in latch 84 is reduced to zero when one of the optosensors (in this example, optosensor B) encounters a transition. This stops dolly 54, at the position illustrated in FIG. 5B.

Figure 5C:
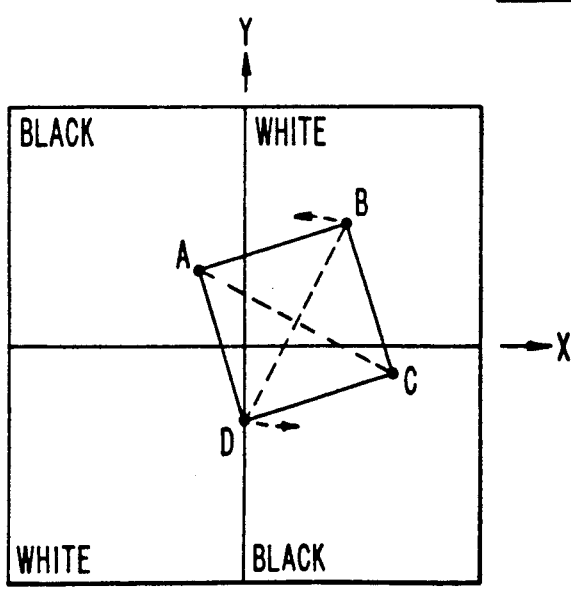
Figure 5D:
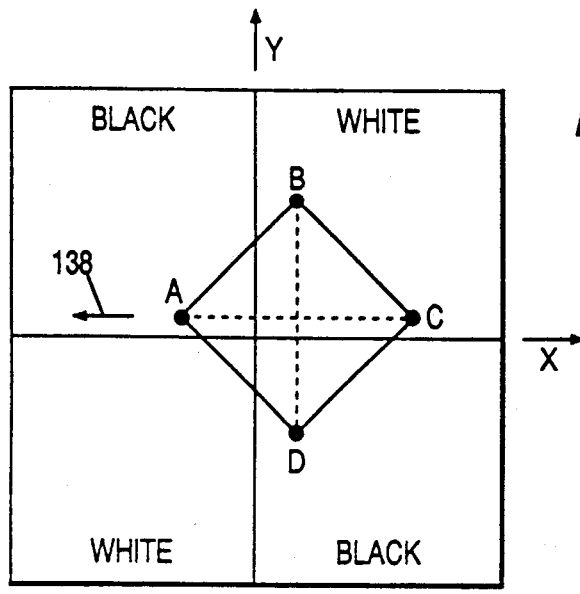
Figure 5E:
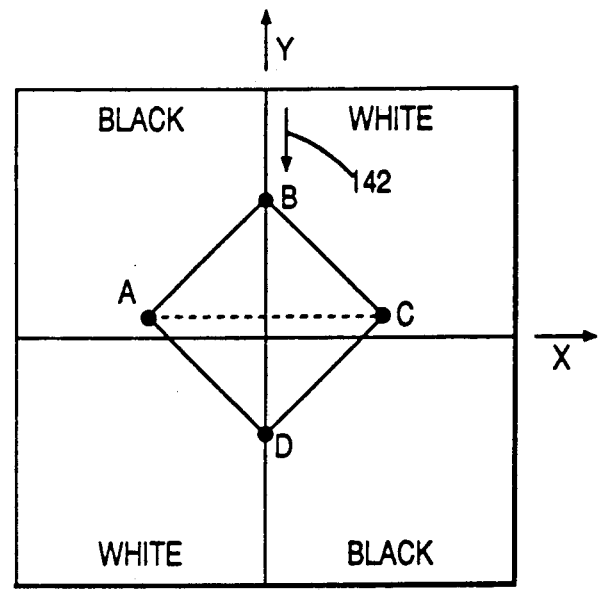

Next, dolly 54 is moved so that one of the diagonals is parallel to one of the axes X or Y of target 20 (step 130 of FIG. 6). This is accomplished by rotating dolly 54 about its vertical axis until a transition is detected by the optosensor (here, optosensor D) opposite the optosensor which detected the initial transition (that is, optosensor B). Rotating dolly 54 is accomplished by loading a small speed command signal into latch 84 and loading a signal corresponding to zero degrees in latch 86, a signal corresponding to 120 degrees in latch 86', and a signal corresponding to 240 degrees in latch 86". The signals in latches 86—86" cause the wheels to turn tangent to a circle. In FIG. 5B, the center about which dolly 54 rotates is the point defined by the intersection of diagonal AC and diagonal BD. Rotating about the center, optosensor D moves through an arc 132 before encountering a transition. The arc 134 through which photosensor B moves during this rotation is equal to arc 132. Propulsion motors 40—40' are stopped when optosensor D detects the transition, leaving the optosensors positioned as illustrated in FIG. 5C. It will be apparent from FIG. 5B that a line connecting the midpoint of arc 132 to the midpoint of arc 134 would be parallel to the Y axis. Accordingly, in FIG. 5C dolly 54 is rotated in the reverse direction by half the length of these arcs. The result is illustrated in FIG. 5D, and it will be noted that diagonal BD is parallel to the Y axis and diagonal AC is parallel to the X axis.

The next step is to find one of the axes (step 136 in FIG. 6). In FIG. 5D this is accomplished by moving dolly 54 so that diagonal AC moves parallel to the X axis as indicated by arrow 138 (determined by which squares the optosensors are positioned over). To do this, the wheels are turned so that they are again parallel to diagonal AC, and propulsion motors 40—40" are slowly driven. The direction in which to move is uniquely determined by the black or white values sensed by the optosensors. In FIG. 5D the dolly is moved in the negative X direction, and optosensors B and D encounter transitions simultaneously along the Y axis. Dolly 54 is thereupon stopped at the position illustrated in FIG. 5E.

In an alternate procedure which might be useful where it cannot be assured that the dead reckoning procedure brings the dolly within 6 inches (only within 12 inches say) of the desired position (centered on the origin of the target), the optosensors might be unable to determine in which direction the dolly should move as might be the case if the axis of the dolly were almost one foot from the origin of the target. In that case, had the direction of arrow 138 in FIG. 5D been reversed, so that the movement was in the positive X direction, photosensor A alone would have encountered a transition. Dolly 54 could then have been brought to the position illustrated in FIG. 5E by reversing the direction of movement after optosensor A encountered a transition, and moving dolly 54 by half the distance of diagonal AC.

Figure 5F:
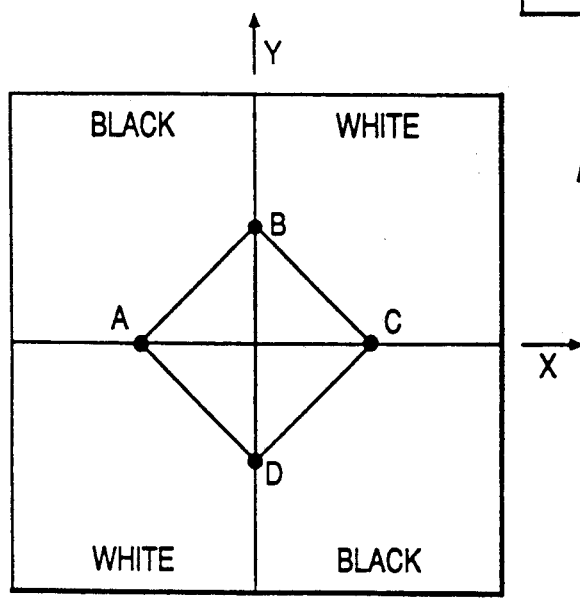

To find the second axis (step 140 in FIG. 6), the wheels are turned so that they are parallel to the first axis (here, the Y axis), and dolly 54 is moved slowly as indicated by arrow 142 until optosensors A and D simultaneously encounter transitions. This leaves dolly 54 correctly positioned and oriented, as shown in FIG. 5F. In the above alternative procedure applicable where it cannot be assured that dead reckoning brings the dolly to within 6" of the desired position, had the direction of arrow 142 in FIGS. 5E been reversed, so that diagonal AC moved in the positive X direction, optosensor D would have encountered the X axis. However, a transition at this stage cannot be reliably detected by optosensor D since the black and white squares come together at the origin. Accordingly, to avoid this problem if the wrong direction is selected for arrow 142, movement is continued in the selected direction until optosensors A and C encounter transitions or until dolly 54 has been moved by more than half the length of a diagonal without transitions having been encountered. In this latter case, the direction of movement is reversed, and thereafter dolly 54 is stopped when optosensors A and C detect transitions.

The preceding discussion of the alignment of dolly 5 with target 20 has been predicated on the assumption that, upon completion of the path-repeat procedure, dolly 54 is located near the desired position and is directed at approximately the desired angle. This assumption should, of course, be verified by several trials after a new path has been taught. Should the assumption be unwarranted it will be necessary to break the path into two or more segments, each of which terminates at a target 20. This permits mid-course corrections to be made before the dead reckoning error becomes undesirably large.

Figure 7:
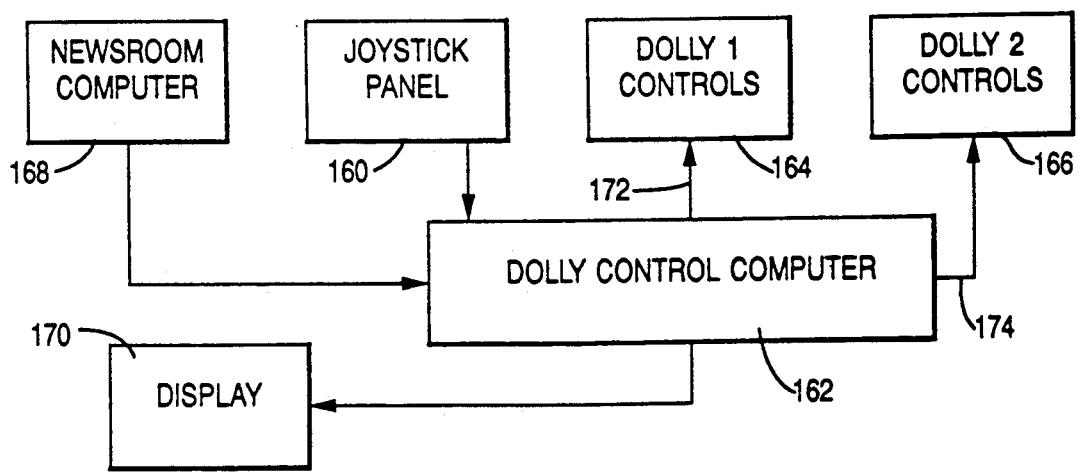
FIG. 7 is a block diagram of a studio system showing the interconnection of various elements thereof and a newsroom computer in a second embodiment of the invention.

A second embodiment of a robotic television camera system in accordance with the present invention will now be described with reference to FIGS. 7 and 8, which show a control system for controlling two dollies. In FIG. 7, remote joystick panel 160 includes two conventional joysticks (not illustrated) and two control switches (not illustrated), one joystick and one control switch being dedicated to control of each of the dollies. A joystick is moved to control the speed and steering of the wheels of the respective dolly 12 via a remote dolly control computer 162 and on board dolly controls 164 for the first camera assembly and 166 for the second camera assembly.

The dolly control computer 162 stores the steering and wheel speed instructions from the control stick so that they may be repeated later. Thus, in this embodiment a single set of instructions is provided to bring the camera assembly from one target to another.

In an alternative embodiment, for simplicity, the computer 162 may be programmed to move the camera assemblies successively along straight path segments to preselected way points along a selected path on the studio floor. The selected path may be altered slightly with "spline fits" to maintain continuous movement of the camera assemblies past the selected way points by smoothing the transitions between adjacent segments on the path. Various combinations of such movements of the camera assemblies may be taught in this manner.

A newsroom computer 168, utilized to control the overall automation of the television program, may be utilized to select the particular paths to be taken in accordance with the alternative dead reckoning technique. A display device 170 coupled to the dolly control computer 162 may also be utilized, for example, to select the particular way points along the path of movement of the camera in the alternative dead reckoning procedure. The display may, for example, include a touch screen for aide in selecting the appropriate path for the respective camera assembly. The newsroom computer may, for example, be the Newstar Newsroom Computer manufactured by Dynatech.

Serial data cables 172 and 174 connect the dolly control computers 162 to the first dolly controls 164 and the second dolly controls 166, respectively. These cables may, for example, be RS 422 buses. In addition to signals used to move the dollies during the teaching operation, the cables 172 and 174 also carry control signals during the actual operation of the camera assemblies to control the translation of the dollies, as well as providing unregulated power and additional signals which may be needed such as pedestal control signals and head control signals for controlling the vertical movement of the pedestal 44 and the rotational movement of the head 46.

Figure 8:
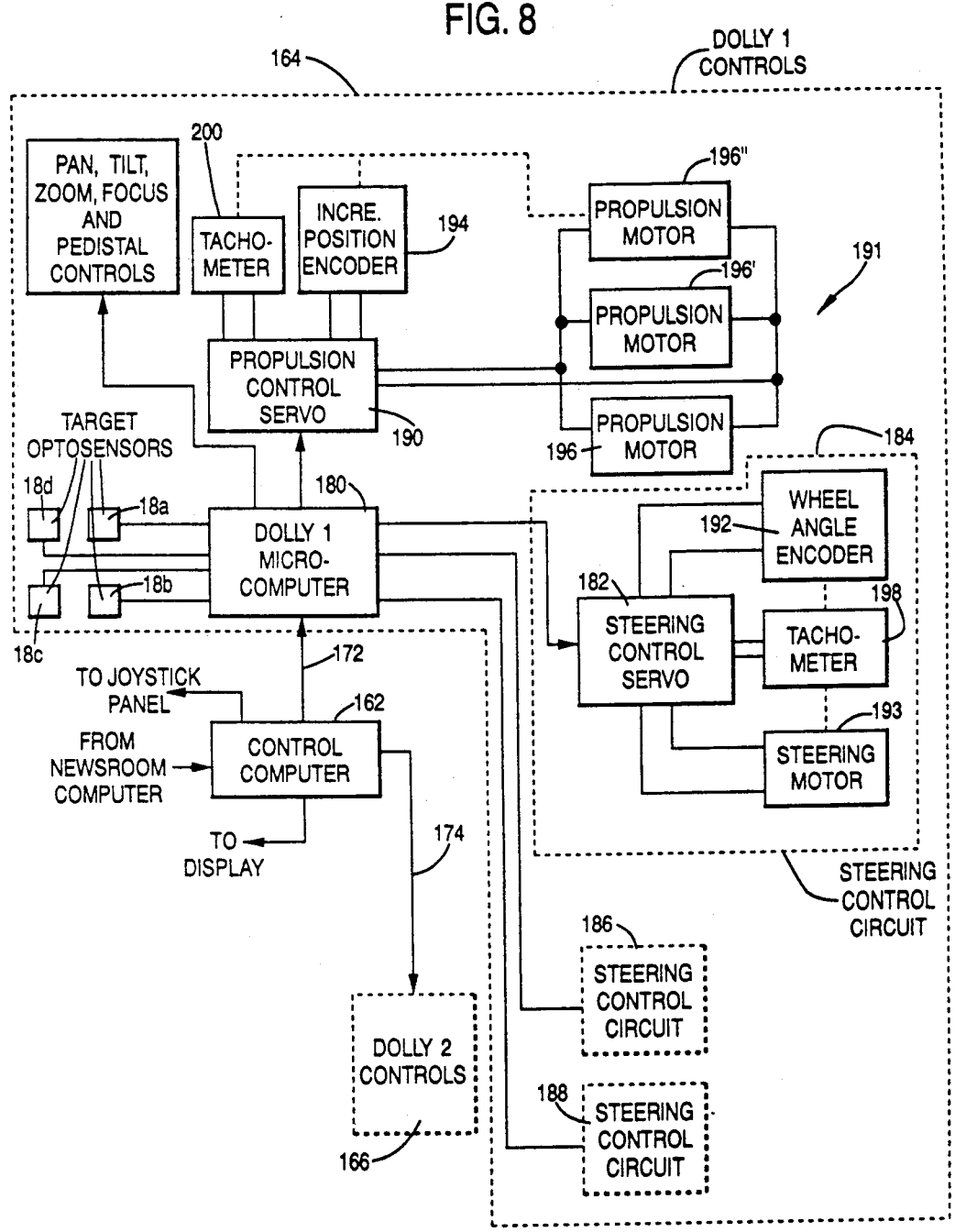
FIG. 8 is a block diagram of the electronics and motors in the second embodiment.

The dolly controls 164 and 166 are substantially identical and are illustrated in FIG. 8. Referring to FIG. 8, dolly control 164, which is substantially identical to dolly control 166, includes a microprocessor 180 which may be of the one-board type, based on the Intel 80286 microprocessor or similar microprocessor.

The microprocessor 180 controls the steering control servo 182 of each of three steering control circuits 184, 186 and 188. The microcomputer 180 also controls a propulsion control servo 190. Each of the servo loops is identical and is controlled in a conventional manner. The digital position loop of each servo loop is fed from an incremental encoder. In the case of the steering control circuit 184, the encoder is a wheel angle encoder 192 mounted on a steering motor 193. In the case of the propulsion control circuit 191, the encoder is an incremental position encoder 194 mounted on one of three propulsion motors 196, 196' and 196".

Each servo loop also uses an analog velocity loop for damping, fed by a tachometer mounted on the respective motor. In the case of the steering control circuit 184, a tachometer 198 is mounted on the steering motor 193 and in the case of the propulsion control circuit 191, a tachometer 200 is mounted on the propulsion motor 196".

In the mode of operation of the dolly in moving from one target to another under the dead reckoning procedure, the dolly microcomputer continually subtracts the actual position of the motor, as read from the respective encoder, from a position demand signal received via the serial link 172 from the control computer 162 to obtain a position error signal, and commands the amplifier of the respective servo to produce a motor velocity proportional to the position error.

For steering, in accordance with the second embodiment of the invention, the wheels are all aligned in parallel and turned in parallel during this first mode of operation in moving the dolly from one target to the immediate vicinity of another target. The propulsion motors 196, 196' and 196" for propulsion of the respective wheels 42 are all disposed in parallel and receive the same propulsion power from the propulsion control servo.

The four photosensors 18 that sense the respective targets 20, are also connected to the microcomputer 180 via standard binary input ports, and signals from the optosensors take over control of the propulsion control servo 190 and steering control servo 180 from the demand signal received via the serial link, during the second mode of operation in which the dolly is exactly located over the target 20 under closed loop control.

Acceleration and turning of the wheels of the dolly are controllable in a conventional manner with a conventional joystick panel 160, dolly control computer 162 and dolly 10 with wheel assemblies 30. The joystick of the joystick panel 160 has two axes of freedom. When moved fore and aft, signals are sent via the dolly control computer to the propulsion control servo causing the dolly to move forward and backward, with a velocity proportional to the stick displacement. When the stick is moved side to side, signals are sent to the steering servo 182 via the control dolly computer 162 to cause the dolly wheels to turn, parallel to each other, progressively to the left or right at a rate proportional to the displacement of the stick. The stick is spring biased so that when released, the spring returns to its central location and the dolly is caused to stop moving, but the wheels stay in the direction they were pointed.

In order to teach a movement of a dolly from one target to another, the dolly must first be properly aligned both in location and angle with respect to the first target. When the operator is ready to commence a move for purposes of teaching, he depresses a start button on the joystick panel 160, and proceed to guide the dolly across the floor with the control stick on the joystick panel, guiding the dolly so as to avoid obstacles and park the dolly reasonably close to the destination target, whereupon a stop button on the joystick panel 160 is depressed.

Prior to moving the dolly for purposes of teaching, the dolly control computer 162 provides an inquiry signal to the operation asking the name (identification) of the dolly move. As a safety measure, the name comprises names (identification) of the start and destination targets being traversed. Move names should be first verified to ensure that the move is compatible with the starting position.

Immediately after the start button is pushed, the dolly control computer 162 begins storing the steering and propulsion demand signals resulting from the movement of the control stick, at a rate of, for example, 15 per second. At this time, pan, tilt, zoom, focus and pedestal demand signals are also recorded, although they are seldom used as most such moves are off-air. Repetitive storing of the demand signals continues until the stop button is pushed.

When the dolly control computer 162 is commanded as via the newsroom computer 168 to replay a dolly motion, it first verifies that the starting position is compatible with the motion. Next, the dolly control computer 162 outputs from its memory the identical sequential positions, at 15 per second, that were generated and stored during the teaching process. As a convenience, any of the motions may be replayed in reverse, to reduce the teaching effort; that is, by teaching a movement from one target to another, a reverse movement is also taught.

For ease of teaching, the targets should be oriented the same, and the dollies' orientation should therefore change little during movement from one target to another, so upon arrival at the destination target, only a minor angular correction and translational correction should be required.

At the completion of this first stage of movement from one target to another, the dolly microcomputer 180, with the use of the target optosensors 18, controls the steering control circuits 184, 186 and 188 and the propulsion control circuit 191 to align the dolly on the destination target 20. The target 20, being formed of black and white squares one foot on a side, provides a two-foot square pattern. The optosensors would therefore preferably be one foot apart in a square shape so that the dolly can be up to approximately six inches out of position in any direction and still be able to find the desired location (the target center), irrespective of the color of the floor on which the targets are disposed. Thus a boundary between the target and the floor will not be inadvertently detected as a transition between white and black squares. If it can be assured that the target boundary will not be misdetected as a transition between squares, a larger deviation of say 12 inches is between the location of the dolly and the desired location at the end of the first (dead reckoning) stage, and the dolly would still be able to find the target center during the second stage.

The dolly is aligned when each of the four optosensors 18 has centered itself above a respective one of the black-to-white transitions of the target 20. The alignment can be accomplished in the manner previously discussed with respect to FIGS. 5A–5F.

Other alternative means for translating the dolly across the studio floor and then realigning at the final position may also be utilized within the scope of the present invention. For example, rather than teaching a complete movement of a dolly from a first target to a second target using a control stick, it is possible to find several points on a floor along the path which the dolly is to take, define these points in the dolly control computer, and then using known computer techniques, allow the computer to define first respective movements from point to point along the path, these points being "way points" and then creating a spline fit so that the dolly traverses a continuous curve past each of the respective way points without stopping.

The importance of correcting the angular orientation of the dolly at the destination target is to assure that there is a reference from which the camera may be rotated. However, it is also possible to effect the rotational alignment by pointing the camera at an azimuth target on a wall of the studio, and determining azimuth orientation by looking through the camera. Similarly, the rotational realignment could be accomplished by rotating the pedestal 44 with the dolly, with the use of a bearing and azimuth servo, and with the optosensors being affixed to the rotation pedestal. Alternatively, the rotational realignment factor could be fed as a correction factor into the pan axis of the head 46. Other variations will be apparent to those skilled in the art.

It will be understood that the above description of the present invention is susceptible to various modifications, changes and adaptations, and the same are intended to be comprehended within the meaning and range of equivalents of the appended claims.

What is claimed is:

1. A positioning system for moving a dolly member along a substantially planar surface, said dolly member having a rotation axis normal to said planar surface and a translation axis parallel to said planar surface, said system comprising:
   a target means for defining a reference point and a reference direction on said planar surface;
   driving means for moving said dolly member on said planar surface;
   detection means affixed to said dolly member for detecting said target means; and
   processor means coupling said detection means to said driving means, said processor means
     controlling said driving means to move said dolly member on said planar surface by dead reckoning to a vicinity of said target means; and
     in response to an output of said detecting means, controlling said driving means to move said dolly member to bring the translation axis thereof parallel to the reference direction defined by said target means, and to bring the rotation axis of said dolly member into coincidence with the reference point defined by said target means.

2. The positioning system defined by claim 1, wherein said processor means stores data corresponding to movement of said dolly member on the planar surface.

3. A positioning system for moving a dolly member along a substantially planar surface, said dolly member having a rotation axis normal to said planar surface and a translation axis parallel to said planar surface, said system comprising:
   a target means for defining a reference point and a reference direction on said planar surface;
   driving means for moving said dolly member on said planar surface;
   detection means affixed to said dolly member for detecting said target means; and
   a processor coupling said detection means to said driving means, said processor including means for
     storing data corresponding to a desired movement of said dolly member along a predetermined path;
     controlling said driving means to move said dolly member approximately along said predetermined path on said planar surface by dead reckoning in accordance with said stored data, the actual position of said dolly member differing from said predetermined path by a position error accumulated during movement thereof, and then moving said dolly member to the vicinity of said target means; and
     in response to an output of said detecting means, controlling said driving means to move said dolly member to bring the translation axis thereof parallel to the reference direction defined by said target means, and to bring the rotation axis of said dolly member into coincidence with the reference point defined by said target means, whereby said dolly member is positioned at said reference point and said accumulated position error is eliminated.

4. The positioning system defined in claim 3, wherein a housing and a camera are mounted on said dolly member, said camera being rotatably mounted on said housing.

5. The positioning system defined by claim 4, wherein said housing carries thereon said detection means and said driving means, said driving means comprising wheels and means, coupled to said processor means, for propelling and turning said wheels.

6. The positioning system defined by claim 5, wherein said wheel propelling and turning means is responsive to signals from said processor means for orienting said wheels in parallel and turning said wheels together to steer said dolly member during translation of said dolly member.

7. The positioning system defined by claim 6, wherein said wheel propelling and turning means is also responsive to signals from said processor means for orienting said wheels tangentially to a circle and propelling said wheels together to rotate said dolly member about said rotation axis.

8. The positioning system defined by claim 3, wherein said driving means comprises means for translating said dolly member along the planar surface and rotating said dolly member about said rotation axis; and wherein said processor means controls said driving means to translate said dolly member along said planar surface by dead reckoning to the vicinity of said target means, said processor means further, in response to the output of said detection means, controlling said driving means to rotate said dolly member to bring the translation axis of said dolly member parallel to the reference direction defined by said target means and translate said dolly member to bring the rotation axis thereof into coincidence with the reference point defined by said target means.

9. The positioning system defined by claim 8, wherein said target means comprises a target member disposed at said reference point, said target member having indicia defining non-parallel lines intersecting at said reference point on the planar surface for defining said reference direction, and wherein said detection means comprises means for detecting said indicia.

10. A positioning system for moving a dolly member along a substantially planar surface, said dolly member having a rotation axis normal to the planar surface and a translation axis parallel to the planar surface, said system comprising:
   a target means for defining a reference point and a reference direction on the planar surface;
   driving means for moving said dolly member on the planar surface;
   detection means affixed to said dolly member for detecting said target means; and
   processor means coupling said detection means to said driving means, said processor means
     in response to an output of said detecting means when said dolly member is in a vicinity of said target means, controlling said driving means to move said dolly member to a first position in which the translation axis thereof is parallel to the reference direction defined by said target means, and the rotation axis of said dolly member is coincident with the reference point defined by said target means, and controlling said driving means to move said dolly member on the planar surface by dead reckoning from said first position to a second position.

11. A method of moving a dolly member along a substantially planar surface, said dolly member having a rotation axis normal to the planar surface and a translation axis parallel to the planar surface, said method comprising the steps of:

locating a target at a fixed position with respect to said planar surface, said target defining a reference point and a reference direction on said surface;

moving said dolly member by dead reckoning from a position on the planar surface to the vicinity of said target; and with the dolly member in a vicinity of said target,
detecting the target with detection means affixed to the dolly member and outputting a detection signal; and in response to the detection signal, moving the dolly member to bring the translation axis thereof parallel to the reference direction defined by the target, and to bring the rotation axis of the dolly member into coincidence with the reference point defined by the target.

12. A method of moving a dolly member along a substantially planar surface, said dolly member having a rotation axis normal to the planar surface and a translation axis parallel to the planar surface, said method comprising the steps of:

locating a target at a fixed position with respect to said planar surface, said target defining a reference point and a reference direction on said surface;

with the dolly member in the vicinity of the target,
detecting the target with detection means affixed to the dolly member and outputting a detection signal, and in response to the detection signal, moving the dolly member to a first position on the planar surface in which the translation axis thereof is parallel to the reference direction defined by the target and the rotation axis of the dolly member is coincident with the reference point defined by the target; and moving the dolly member by dead reckoning from the first position on the planar surface to a second position on said surface.

13. The method defined by claim 12, further comprising the steps of:

teaching said dolly member to respond to a start signal to move along a specified path from the first position to the second position; and producing the start signal to initiate said step of moving the dolly member by dead reckoning to said second position.

14. The method defined by claim 12, wherein said step of moving the dolly member to bring it into the first position comprises the steps of rotating and translating said dolly member to bring the translation axis thereof parallel to the reference direction defined by the target; and bringing the rotation axis of the dolly member into coincidence with the reference point defined by said target.

15. The method defined by claim 14, wherein said step of translating and rotating said dolly member comprises the steps of steering and propelling wheels on which the dolly member is supported.

16. The method defined by claim 15, further comprising the step of rotating a camera rotatably mounted on the dolly member about a camera axis normal to the planar surface.

17. A method of moving a dolly member along a substantially planar surface, said dolly member having a rotation axis normal to said planar surface and a translation axis parallel to said planar surface, said method comprising the steps of:

locating a target means for defining a reference point and a reference direction on said planar surface;

storing data corresponding to a desired movement of said dolly member along a predetermined path;

controlling a driving means to move said dolly member approximately along said predetermined path on said planar surface by dead reckoning in accordance with said stored data, the actual position of said dolly member differing from said predetermined path by a position error accumulated during movement thereof, and then moving said dolly member to the vicinity of said target means; and in response to an output from detecting means affixed to said dolly member for detecting said target means, controlling said driving means to move said dolly member to bring the translation axis thereof parallel to the reference direction defined by said target means, and to bring the rotation axis of said dolly member into coincidence with the reference point defined by said target means, whereby said dolly member is positioned at said reference point and said accumulated position error is eliminated.

* * * * *

REEXAMINATION CERTIFICATE (1997th)

United States Patent [19]

Gordon et al.

[11] B1 5,008,804

[45] Certificate Issued May 4, 1993

[54] ROBOTIC TELEVISION-CAMERA DOLLY SYSTEM

[75] Inventors: Gary B. Gordon, Saratoga, Calif.; Robert R. Gosselli, Valley Cottage, N.Y.

[73] Assignee: Total Spectrum Manufacturing Inc., Valley Cottage, N.Y.

Reexamination Requests:
No. 90/002,475, Oct. 11, 1991
No. 90/002,710, Apr. 27, 1992

Reexamination Certificate for:
Patent No.: 5,008,804
Issued: Apr. 16, 1991
Appl. No.: 574,852
Filed: Aug. 30, 1990

Related U.S. Application Data

[63] Continuation of Ser. No. 228,933, Jun. 23, 1988, Pat. No. 4,959,798.

[51] Int. Cl.$^5$ .............................................. F16M 3/00
[52] U.S. Cl. ................... 364/167.01; 358/229; 352/197; 352/243; 248/647; 180/168; 364/436
[58] Field of Search ............. 364/167.01, 436, 460; 180/167, 168, 169; 248/647; 358/229; 352/197, 243

[56] References Cited

U.S. PATENT DOCUMENTS

| | | | |
|---|---|---|---|
| 3,612,206 | 10/1971 | Ohntrup | 318/587 |
| 3,715,572 | 2/1973 | Bennett | 364/460 |
| 4,025,838 | 5/1977 | Watanabe | 395/92 |
| 4,257,619 | 3/1981 | Fisher | 280/91 |
| 4,278,142 | 7/1981 | Kono | 364/424.02 |
| 4,344,498 | 8/1982 | Lindfors | 364/436 |
| 4,500,970 | 2/1985 | Daemmer | 180/168 |
| 4,554,498 | 11/1985 | Fujiwara et al. | 318/640 |
| 4,657,220 | 4/1987 | Lindsay | 352/243 |
| 4,751,658 | 6/1988 | Kadonoff et al. | 364/513 |
| 4,811,227 | 3/1989 | Wikstrom | 364/424.02 |
| 4,815,008 | 3/1989 | Kadonoff et al. | 364/513 |
| 4,821,192 | 4/1989 | Taivalkoski et al. | 364/513 |
| 4,866,617 | 9/1989 | Matsuda et al. | 364/424.02 |

FOREIGN PATENT DOCUMENTS

| | | |
|---|---|---|
| 2554800 | 5/1985 | France . |
| 158678 | 9/1984 | Japan . |
| 0138616 | 7/1985 | Japan . |
| 0196817 | 10/1985 | Japan . |
| 042208 | 2/1987 | Japan . |
| 0000711 | 1/1988 | Japan . |
| 2053516 | 2/1981 | United Kingdom . |

OTHER PUBLICATIONS

Craft—a small, prototype AGV for parts transfer between machine tools; D. M. Allen; Proc. of Third Inter. Conf. on Automated Guided Vehicle Systems; Oct. 1985; pp. 11–121.

Dead Reckining Guidance Combined with Guide Path Method for AGVs; Komatsu et al; Proc. 5th Int. Conf. Automated Guided Vehicle Systems; Oct. 1987; pp. 123–136.

*Primary Examiner*—Allen MacDonald

[57] ABSTRACT

A robotic camera dolly system includes a motorized dolly which rolls freely across a studio floor under computer control, the dolly carrying a camera. Targets are provided on the floor at various locations from which camera shots are to be taken. The dolly is moved from one target to the vicinity of another target according to a learned sequence of movements controlled by a remote dolly computer. The learned sequence of movements is taught with the aid of a joystick, and the motions are replayed based on dead reckoning. In order to correct translational and angular errors in the position of the dolly at the destination target, optosensors are provided on the dolly for use in detecting and reorientating the dolly relative to the destination target. The open loop control of dolly movement can be taught with a control stick and the motions replayed based on dead reckoning.

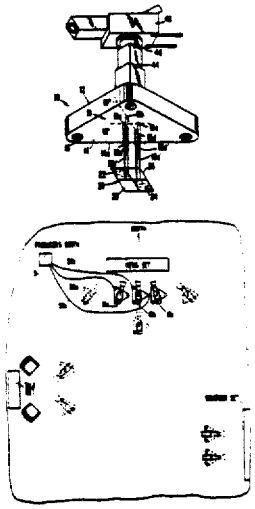

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 12, lines 16–37:

At the completion of this first stage of movement from one target to another, the dolly microcomputer 180, with the use of the target optosensors 18, controls the steering control circuits 184, 186 and 188 and the propulsion control circuit 191 to align the dolly on the destination target 20. The target 20, being formed of black and white squares one foot on a side, provides a two-foot square pattern. The optosensors would therefore preferably be one foot apart in a square shape so that the dolly can be up to approximately six inches out of position in any direction and still be able to find the desired location (the target center), irrespective of the color of the floor on which the targets are disposed. Thus a boundary between the target and the floor will not be inadvertently detected as a transition between white and black squares. If it can be assured that the target boundary will not be misdetected as a transition between squares, a larger deviation of say 12 inches is *permissible* between the location of the dolly and the desired location at the end of the first (dead reckoning) stage, and the dolly would still be able to find the target center during the second stage.

AS A RESULT OF REEXAMINATION, IT HAS BEEN DETERMINED THAT:

The patentability of claims 11–16 is confirmed.

Claims 1, 3, 10 and 17 are determined to be patentable as amended.

Claims 2 and 4–9, dependent on an amended claim, are determined to be patentable.

1. A positioning system for moving a dolly member along a substantially planar surface, said dolly member having a rotation axis normal to said planar surface and a translation axis parallel to said planar surface, said system comprising:
   a target means for defining a reference point and a reference direction on said planar surface;
   driving means for moving said dolly member on said planar surface;
   detection means affixed to said dolly member for detecting said target means; and
   processor means coupling said detection means to said driving means, said processor means
      controlling said driving means to move said dolly member on said planar surface by dead reckoning to a vicinity of said target means; and
      in response to an output of said [detecting] *detection* means, controlling said driving means to move said dolly member to bring the translation axis thereof parallel to the reference direction defined by said target means, and to bring the rotation axis of said dolly member into coincidence with the reference point defined by said target means.

3. A positioning system for moving a dolly member along a substantially planar surface, said dolly member having a rotation axis normal to said planar surface and a translation axis parallel to said planar surface, said system comprising:
   a target means for defining a reference point and a reference direction on said planar surface;
   driving means for moving said dolly member on said planar surface;
   detection means affixed to said dolly member for detecting said target means; and
   a processor coupling said detection means to said driving means, said processor including means for
      storing data corresponding to a desired movement of said dolly member along a predetermined path;
      controlling said driving means to move said dolly member approximately along said predetermined path on said planar surface by dead reckoning in accordance with said stored data, the actual position of said dolly member differing from said predetermined path by a position error accumulated during movement thereof, and then moving said dolly member to the vicinity of said target means; and
      in response to an output of said [detecting] *detection* means, controlling said driving means to move said dolly member to bring the translation axis thereof parallel to the reference direction defined by said target means, and to bring the rotation axis of said dolly member into coincidence with the reference point defined by said target means, whereby said dolly member is positioned at said reference point and said accumulated position error is eliminated.

10. A positioning system for moving a dolly member along a substantially planar surface, said dolly member having a rotation axis normal to the planar surface and a translation axis parallel to the planar surface, said system comprising:
   a target means for defining a reference point and a reference direction on the planar surface;
   driving means for moving said dolly member on the planar surface;
   detection means affixed to said dolly member for detecting said target means; and
   processor means coupling said detection means to said driving means, said processor means
      in response to an output of said [detecting] *detection* means when said dolly member is in a vicinity of said target means, controlling said driving means to move said dolly member to a first position in which the translation axis thereof is parallel to the reference direction defined by said target means, and the rotation axis of said dolly member is coincident with the reference point defined by said target means, and
      controlling said driving means to move said dolly member on the planar surface by dead reckoning from said first position to a second position.

17. A method of moving a dolly member along a substantially planar surface, said dolly member having a rotation axis normal to said planar surface and a translation axis parallel to said planar surface, said method comprising the steps of:

locating a target means for defining a reference point and a reference direction on said planar surface;

storing data corresponding to a desired movement of said dolly member along a predetermined path;

controlling a driving means to move said dolly member approximately along said predetermined path on said planar surface by dead reckoning in accordance with said stored data, the actual position of said dolly member differing from said predetermined path by a position error accumulated during movement thereof, and then moving said dolly member to the vicinity of said target means; and in response to an output from [detecting] *detection* means affixed to said dolly member for detecting said target means, controlling said driving means to move said dolly member to bring the translation axis thereof parallel to the reference direction defined by said target means, and to bring the rotation axis of said dolly member into coincidence with the reference point defined by said target means, whereby said dolly member is positioned at said reference point and said accumulated position error is eliminated.

* * * * *

REEXAMINATION CERTIFICATE (2766th)

United States Patent [19]
Gordon et al.

[11] B2 5,008,804
[45] Certificate Issued Jan. 2, 1996

[54] ROBOTIC TELEVISION-CAMERA DOLLY SYSTEM

[75] Inventors: Gary B. Gordon, Saratoga, Calif.; Robert R. Gonnelli, Valley Cottage, N.Y.

[73] Assignee: Total Spectrum Manufacturing Inc., Valley Cottage, N.Y.

Reexamination Request:
No. 90/002,976, Mar. 2, 1993

Reexamination Certificate for:
Patent No.: 5,008,804
Issued: Apr. 16, 1991
Appl. No.: 574,852
Filed: Aug. 30, 1990

Reexamination Certificate B1 5,008,804 issued May 4, 1993.

Related U.S. Application Data

[63] Continuation of Ser. No. 228,933, Jun. 23, 1988, Pat. No. 4,959,798.

[51] Int. Cl.[6] .................................................... F16M 3/00
[52] U.S. Cl. .................. 364/167.01; 180/168; 248/647; 348/373; 352/197; 352/243; 364/190; 364/436
[58] Field of Search .................. 364/424.02, 424.01; 180/168–179, 167; 358/229; 352/197, 242, 243, 244; 248/647

[56] References Cited

U.S. PATENT DOCUMENTS

| | | | |
|---|---|---|---|
| 4,119,900 | 10/1978 | Kremnitz | 364/424 |
| 4,344,498 | 8/1982 | Lindfors | 180/168 |
| 4,530,056 | 7/1985 | MacKinnon et al. | 364/424.02 |
| 4,815,008 | 3/1989 | Kadonoff | 364/424.02 |
| 4,950,126 | 8/1990 | Fabiano et al. | 414/590 |
| 4,959,798 | 9/1990 | Gordon et al. | 364/167.01 |
| 5,153,833 | 10/1992 | Gordon et al. | 364/424.02 |

FOREIGN PATENT DOCUMENTS

| | | |
|---|---|---|
| 2554800 | 5/1985 | France . |
| 59-158678 | 9/1984 | Japan . |
| 0138616 | 7/1985 | Japan . |
| 0196817 | 10/1985 | Japan . |
| 0000711 | 1/1988 | Japan . |
| 2053516 | 2/1981 | United Kingdom . |

*Primary Examiner*—Allen R. MacDonald

[57] ABSTRACT

A robotic camera dolly system includes a motorized dolly which rolls freely across a studio floor under computer control, the dolly carrying a camera. Targets are provided on the floor at various locations from which camera shots are to be taken. The dolly is moved from one target to the viciniy of another target according to a learned sequence of movements controlled by a remote dolly computer. The learned sequence of movements is taught with the aid of a joystick, and the motions are replayed based on dead reckoning. In order to correct translational and angular errors in the position of the dolly at the destination target, optosensors are provided on the dolly for use in detecting and reorienting the dolly relative to the destination target. The open loop control of dolly movement can be taught with a control stick and the motions replayed based on dead reckoning.

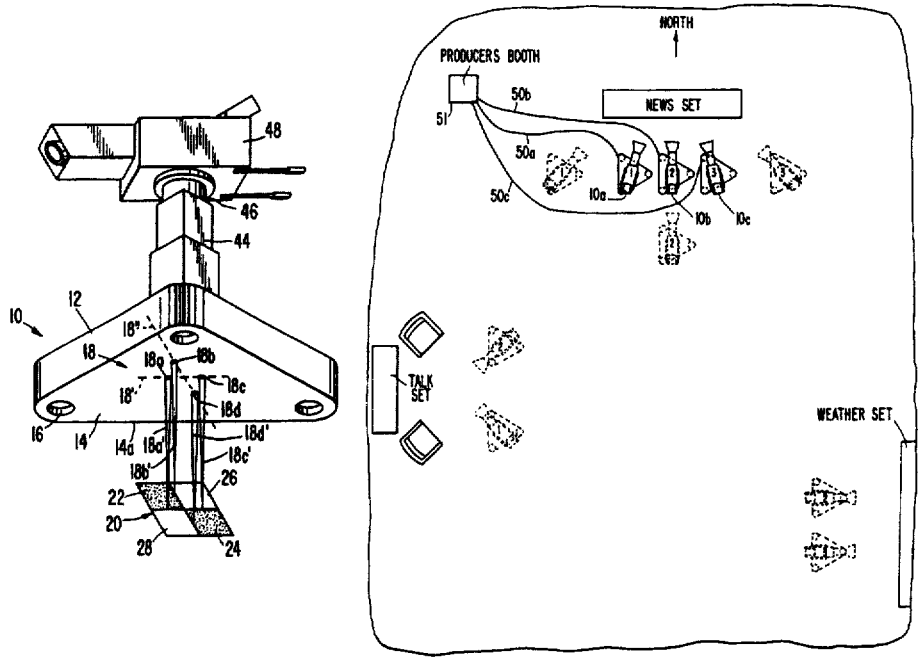

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–17 are cancelled.

* * * * *